United States Patent
Gabriel et al.

(10) Patent No.: US 9,566,670 B2
(45) Date of Patent: Feb. 14, 2017

(54) METHOD FOR BONDING PISTON COMPONENTS

(71) Applicant: Mahle International GmbH, Stuttgart (DE)

(72) Inventors: Dieter Gabriel, Highland, MI (US); Wolfgang Rein, Milford, MI (US)

(73) Assignee: Mahle International GmbH (DE)

( * ) Notice: Subject to any disclaimer, the term of this patent is extended or adjusted under 35 U.S.C. 154(b) by 171 days.

(21) Appl. No.: 14/266,771

(22) Filed: Apr. 30, 2014

(65) Prior Publication Data

US 2014/0317924 A1    Oct. 30, 2014

Related U.S. Application Data (60) Provisional application No. 61/817,380, filed on Apr. 30, 2013.

(51) Int. Cl.
    *B23P 15/10*      (2006.01)
    *B23K 1/00*      (2006.01)
    (Continued)

(52) U.S. Cl.
    CPC .............. *B23P 15/10* (2013.01); *B23K 1/0004* (2013.01); *B23K 11/087* (2013.01); *B23K 11/14* (2013.01);
    (Continued)

(58) Field of Classification Search
    CPC .................. F02F 3/16; F02F 3/20; F02F 3/22; F02F 3/225; F02F 2003/0038; F02F 2003/0061; B23P 15/10; B23K 11/14; B23K 1/0004; Y10T 29/49252; Y10T 29/49249
    See application file for complete search history.

(56) References Cited

U.S. PATENT DOCUMENTS 2,205,680 A * 6/1940 Caputo .............. B23K 11/3036
    219/84
2002/0124721 A1* 9/2002 Bedwell ................ F02F 3/0015
    92/222

FOREIGN PATENT DOCUMENTS

EP      2025441 A1    2/2009

OTHER PUBLICATIONS

ASM International Handbook Committee. (1993). ASM Handbook, vol. 06—Welding, Brazing, and Soldering. ASM International. Online version available at: http://app.knovel.com/hotlink/toc/id:kpASMHVWB1/asm-handbook-volume-06/asm-handbook-volume-06 pp. 230-237 and 339-342.*

(Continued)

*Primary Examiner* — Jason L Vaughan
*Assistant Examiner* — Amanda Meneghini
(74) *Attorney, Agent, or Firm* — Fishman Stewart PLLC (57) ABSTRACT

An exemplary method of making a piston assembly may include providing a piston crown defining at least in part an upper combustion bowl surface. The piston crown includes at least one crown mating surface. The method further comprising moving the crown mating surface in proximity to a skirt mating surface defined by a piston skirt, wherein the crown and skirt cooperate to define a cooling gallery extending about a periphery of the crown. The method may further include bonding the crown and skirt together by initiating an electric current along a conductive path between the crown and skirt mating surfaces, the conductive path comprising at least one conductive material extending from the crown mating surface to the skirt mating surface.

7 Claims, 4 Drawing Sheets

(51) Int. Cl.
*F02F 3/00* (2006.01)
*B23K 11/087* (2006.01)
*B23K 11/14* (2006.01)
*F02F 3/22* (2006.01)

(52) U.S. Cl.
CPC ......... *F02F 3/003* (2013.01); *B23K 2201/003* (2013.01); *F02F 3/22* (2013.01); *F02F 2003/0038* (2013.01); *Y10T 29/49258* (2015.01); *Y10T 29/49266* (2015.01)

(56) References Cited

OTHER PUBLICATIONS

English Abstract for EP 2025441A1.

\* cited by examiner

METHOD FOR BONDING PISTON COMPONENTS

CROSS-REFERENCE TO RELATED APPLICATIONS

This application claims priority to U.S. Provisional Application Ser. No. 61/817,380, filed on Apr. 30, 2013, the contents of which are hereby expressly incorporated by reference in its entirety.

FIELD

The present disclosure is directed to piston assemblies in general, and more specifically to methods of bonding piston components together.

BACKGROUND

The severe service conditions typical of internal combustion engines, e.g., diesel engines, generally require the pistons in such engines to be formed of a strong and durable material. To address these needs, the pistons used in diesel engines are often made of steel. Additionally, the extremely hot combustion chamber temperatures often require the pistons be cooled during engine operation. For example, a piston crown in a diesel engine may be cooled with an oil spray directed at the bottom of the crown and with an internal feature of the crown such as an oil gallery. The oil spray and oil circulating in the gallery may remove some of the excessive heat generated during engine operation.

To facilitate the construction of a piston assembly with an oil gallery in the piston crown, a two part piston is used in some diesel engines. The top piece, the crown, is the part of the piston exposed to the extremely hot combustion temperatures. The bottom piece, called the skirt, generally provides piston guidance within the cylinder. The crown or skirt may also provide a holder for the piston rings that interface with cylinder bore surfaces, such as ring grooves that receive the piston rings.

Current methods of joining a piston crown and skirt have inherent limitations. Vacuum brazing, for example, is a relatively expensive and time consuming process. Vacuum brazing requires the work piece be processed in a controlled environment.

Proper alignment of features on the crown and skirt is critical to proper engine performance. Tolerances for the finished piston feature alignment are typically in the tenths of millimeters, therefore, the tolerance for error in alignment of the crown and skirt in the blank is also extremely small. Thus, dynamic processes, such as friction welding, may be difficult to execute while meeting the exacting tolerances needed of the finished piston assembly. More specifically, friction welding typically involves spinning one of the two piston components being joined. Stopping the crown or skirt in the exact spot to correctly orient it with the other piece is generally difficult to accomplish.

Additionally, inconsistent weld thicknesses can also cause problems with the piston during operation. A weld that is too thick or too thin will cause the vertical or Z-dimension of the piston to be out of tolerance. Out of tolerance pistons may prematurely fail in service, or cause damage to engine components. The friction welding process does not add metal to the system to form the metallurgical bond between the two component pieces. Rather, metal from the pieces is sacrificed to from the bond between the two parts. This may cause the Z dimension of the two joined parts to change inconsistently, and may cause scrap, or premature failure of the engine components.

Some pistons have intricate, internal features that cannot be reached with standard welding techniques, and offset or asymmetrical features may not be easily formed in welding techniques. The clearances and access to these features are usually small and standard welding equipment cannot be used. The geometry and alignment requirements of the features internal to the crown eliminate friction welding as a feasible option to join piston components with intricate internal features.

Accordingly, there is a need for an improved piston assembly and method of making the same that addresses the above problems.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Exemplary illustrations are provided herein of methods of making a piston assembly. One exemplary method includes providing a piston crown defining at least in part an upper combustion bowl surface. The piston crown includes at least one crown mating surface. The method further comprising moving the crown mating surface in proximity to a skirt mating surface defined by a piston skirt, wherein the crown and skirt cooperate to define a cooling gallery extending about a periphery of the crown. The method may further include bonding the crown and skirt together by initiating an electric current along a conductive path between the crown and skirt mating surfaces, the conductive path comprising at least one conductive material extending from the crown mating surface to the skirt mating surface. In some exemplary approaches, a conductive path may be provided by contacting the crown and skirt mating surfaces together, such that the conductive path extends from the crown to the skirt by way of direct contact between the crown mating surface and skirt mating surface. In other exemplary approaches, a brazing material is provided between the crown mating surface and skirt mating surface, such that the conductive path extends from the crown mating surface to the brazing material, and extends further from the brazing material to the skirt mating surface.

Figure 1:
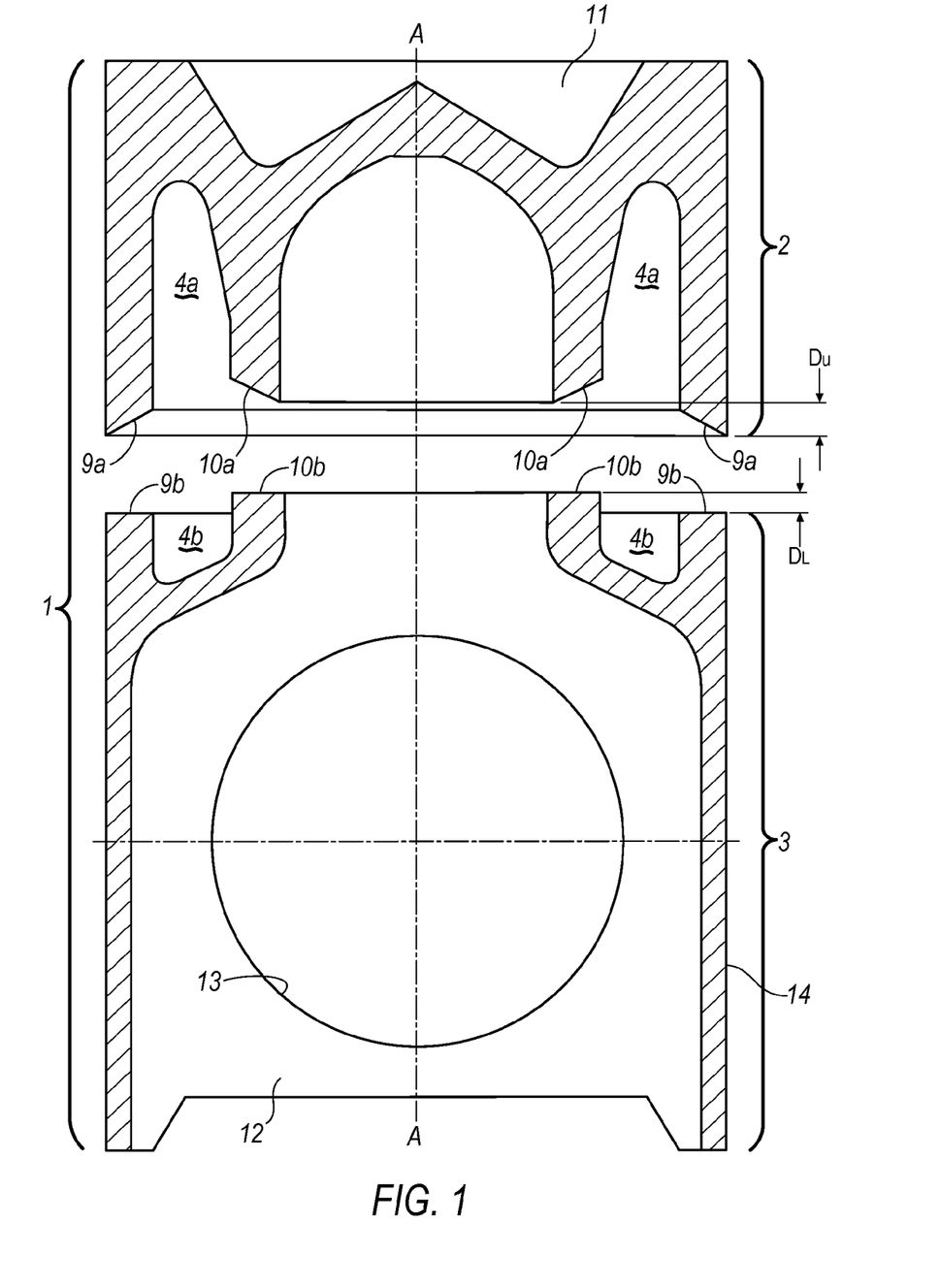
FIG. 1 is a section view illustrating a piston for an internal combustion engine, e.g., a diesel engine, according to an exemplary illustration.

Turning now to FIG. 1, an exemplary piston assembly 1 is shown prior to joining of an upper part 2 and lower part 3 thereof. The piston assembly 1 may move reciprocally within a cylinder (not shown). The upper part or crown 2 generally defines an upper structure of the piston assembly 1. For example, the crown 2 may define a combustion bowl surface 11. An outer circumferential surface of the crown 2 may define one or more ring grooves (not shown) for receiving piston rings, which may generally be configured to interface with cylinder bore surfaces (not shown) of a cylinder receiving the piston assembly 1. While the combustion bowl surface 11 is shown being generally symmetrical about a piston axis A-A of the piston 1, in other examples the combustion bowl may be offset or asymmetrical with respect to the piston axis A-A. Moreover, as will be further described below, exemplary resistance brazing and resistance projection welding processes may facilitate formation of asymmetrical or offset features in the piston assembly, since the parts may be held stationary during the bonding process. By contrast, previous approaches such as friction welding generally require rotational symmetry of the joined parts.

The lower part or skirt 3 may generally define a lower structure of the piston assembly 1. More specifically, the skirt 3 may define a pair of pin bosses 12 (one pin boss 12 shown in FIG. 1), each defining a piston pin bore 13. The pin bore 13 may be configured to receive a piston pin (not shown) for securing a connecting rod to the piston assembly 1. More specifically, the pin bosses 12 may be generally spaced apart to define a space therebetween for receiving the connecting rod (not shown). Additionally, the skirt 3 may define a generally circular skirt surface 14 for interfacing with bore surfaces (not shown) of a cylinder receiving the piston assembly 1.

Figure 2A:
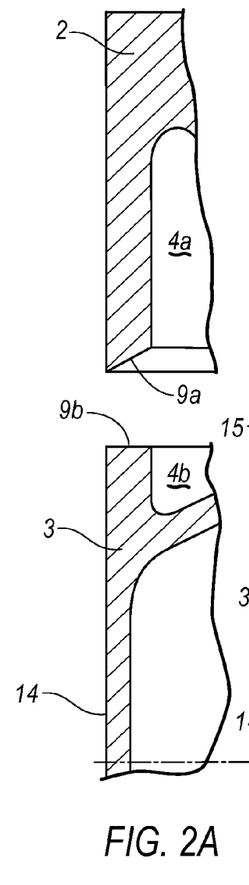
FIG. 2A is a partial sectional view of another exemplary piston assembly, shown prior to bonding together an upper and lower part in a projection welding process.
Figure 2B:
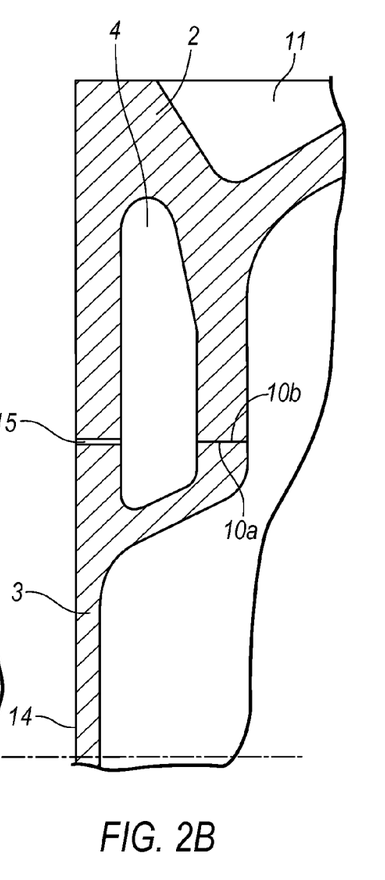
FIG. 2B is a partial sectional view of the piston assembly of FIG. 2A, shown after the upper and lower parts are bonded together.
Figure 3A:
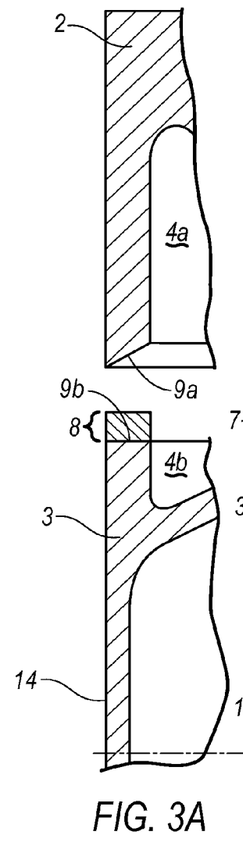
FIG. 3A is a partial sectional view of another exemplary piston assembly, shown prior to bonding together an upper and lower part in a resistance brazing process, and illustrating the oil gallery with a resistance braze metal present on the lower part.
Figure 3B:
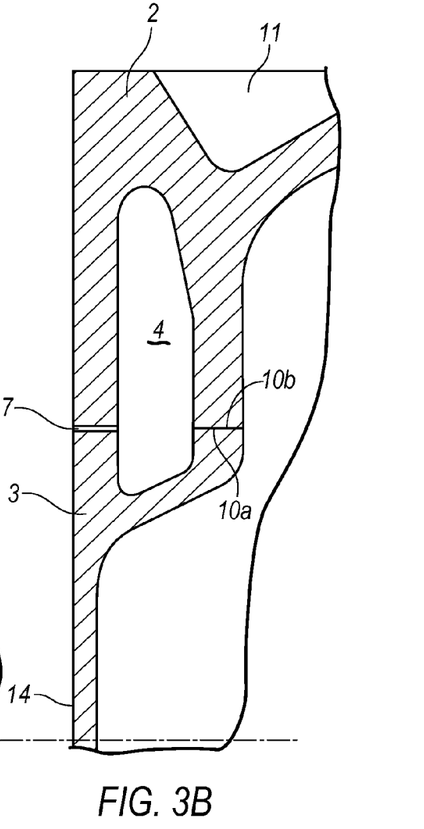
FIG. 3B is a partial sectional view of the piston assembly of FIG. 3A, shown after the upper and lower parts are bonded together in the resistance brazing operation.

The crown 2 and skirt 3 may cooperate to form a cooling gallery 4 which extends circumferentially about the piston 1 (see FIGS. 2B and 3B). More specifically, as shown in FIG. 1 the crown 2 may define an upper portion 4a of the cooling gallery, while the skirt 3 defines a lower portion 4b of the cooling gallery. Accordingly, upon joining the crown 2 and skirt 3 as shown in FIGS. 2B and 3B, the upper portion 4a and lower portion 4b are generally combined to form the cooling gallery 4. During operation of an engine using the piston assembly 1, oil or other coolants may be circulated through the cooling gallery 4 to remove heat from the piston assembly 1, and in particular from upper areas of the piston assembly 1 such as the crown 2 or combustion bowl 11. In one example, oil circulates between the cooling gallery 4 and an oil cooler (not shown).

The crown 2 and skirt 3 may be formed of any materials that are convenient. In one exemplary illustration, the crown 2 and skirt 3 are each formed of a conductive material. Accordingly, the crown 2 and skirt 3 may generally facilitate transmission of an electric current within the materials forming the crown 2 and skirt 3 for bonding the crown 2 and skirt 3 together, as will be described further below. In another example, the crown 2 and skirt 3 are each formed of a steel material. The crown 2 and skirt 3 may be formed of the same material, or of different materials. For example, the crown 2 and skirt 3 may each be formed of a 42CrMo4 (4140 US designation) steel material. In another exemplary approach, the skirt 3 is formed of a 38MnVS6 steel material, while the crown 2 is formed of either a 42CrMo4 (4140 US designation) steel material or a 38MnVS6 steel material. In other examples, the crown 2 may be formed of an oxidation-resistant, corrosion-resistant, or high-temperature resistant alloy such as a chromium alloy, nickel alloy, chromium and nickel alloy, high nickel alloy such as Inconel, molybdenum alloy, titanium alloy, niobium alloy, tungsten alloy, vanadium alloy, or cobalt alloyed steel.

The crown 2 and skirt 3 may be joined along one or more mating surfaces, e.g., in any of the exemplary bonding processes described below. As shown in FIG. 1, crown 2 may define an outer mating surface 9a which corresponds to an outer mating surface 9b of the skirt 3. The crown 2 may also define an inner mating surface 10a, which corresponds to an inner mating surface 10b of the skirt 3.

The mating surfaces 9, 10 may generally be configured to facilitate a bonding process between at least one of the pairs of mating surfaces 9, 10 in the exemplary bonding processes described below. For example, the inner and outer mating surfaces 9a, 10a of the crown 2 may define an oblique angle with respect to the inner and outer mating surfaces 9b, 10b of the skirt 3, respectively. The oblique angle of one of the mating surfaces with respect to a corresponding mating surface may allow for a narrower or more focused path for electricity between the crown 2 and skirt 3 during any of the exemplary bonding processes, thereby increasing current density at an interface between associated mating surfaces. The increased current density may facilitate melting of a material to join the crown 2 and skirt 3 together.

Additionally, the inner and outer mating surfaces 9a, 10a of the crown 2 may define a vertical offset distance $D_U$ that is different from a vertical offset distance $D_L$ of the inner and outer mating surfaces 9b, 10b of the skirt 3. In this manner, as the crown 2 and skirt 3 are brought in proximity to one another for joining, only one of the pairs of mating surfaces, e.g., mating surface 9a, 9b, initially comes into contact with each other, while the other pair of mating surfaces, e.g., mating surfaces 10a, 10b, remain spaced apart from each other. As will be described further below, in examples where an electrical current is conducted through the crown 2 and skirt 3 as part of a bonding process, it may be desirable to ensure that only one pair of mating surfaces, e.g., mating surfaces 9a and 9b, are in contact while the electrical current is conducted through the crown 2 and skirt 3. This may in turn increase current density through pair of mating surfaces that is closer together. While the examples below in FIGS. 2A-2C and 3A-3C are generally directed to a crown 2 and skirt 3 that are bonded along the outer mating surfaces 9a, 9$b$, in other exemplary illustrations approaches the crown 2 and skirt 3 are bonded along the inner mating surfaces 10$a$, 10$b$.

In one example, the crown 2 and skirt 3 are joined by bonding along only one of the inner and outer mating surfaces 9, 10. For example, as will be described further below in regard to FIGS. 2A-2C, and 3A-3C, the outer mating surfaces 9$a$, 9$b$ may be bonded together in either a resistance brazing process or a projection resistance welding process. By contrast, the inner mating surfaces 10$a$, 10$b$ may be abutted together without being permanently joined or bonded together, as will be described further in regard to FIGS. 2B and 3B.

Figure 2C:
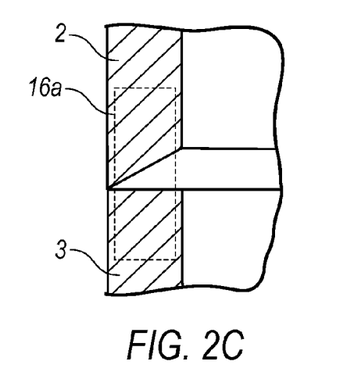
FIG. 2C is a partial sectional view of the piston assembly of FIG. 2A, illustrating a conductive path that includes the upper and lower part in direct contact.

Turning now to FIGS. 2A-2C, the piston assembly 1 is shown being joined in an exemplary process where the crown 2 and skirt 3 are bonded directly together. More specifically, in FIG. 2A the crown 2 is shown spaced apart from the skirt 3, such that the mating surfaces 9$a$, 9$b$ and 10$a$, 10$b$ are each spaced apart. One of the crown mating surfaces 9$a$ may then be brought into proximity with the corresponding skirt mating surface 9$b$, and in this example may be brought into direct contact with the corresponding skirt mating surface 9$b$, as shown in FIG. 2C. An electrical current may then be provided that runs through the crown 2 to the skirt 3, and in particular along a conductive path 16$a$ that includes both of the crown mating surface 9$a$ and skirt mating surface 9$b$ which are in direct contact. The electrical current may heat the material of the crown 2 and/or skirt 3, thereby melting one or both along or near the crown and skirt mating surfaces 9$a$, 9$b$. The current may then be cut off, such that the melted material cools or otherwise solidifies, thereby permanently bonding the crown 2 and skirt 3 along the crown and skirt mating surfaces 9$a$, 9$b$. Moreover, the process of melting the crown 2 and/or skirt 3 along the outer mating surfaces 9$a$, 9$b$ may waste some of the material of the crown 2 and/or skirt 3, e.g., at the narrow point of contact between the lowermost edge of the mating surface 9$a$ in contact with the mating surface 9$b$, thereby bringing the crown 2 and skirt 3 closer together. In one example, the wasted material and movement of the crown 2 relative to the skirt 3, even if very small, allows the other pair of mating surfaces, in this example the inner mating surfaces 10$a$, 10$b$, to come into contact, thereby generally enclosing the cooling gallery 4.

Figure 3C:
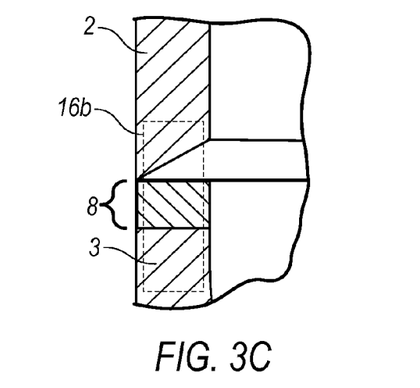
FIG. 3C is a partial sectional view of the piston assembly of FIG. 3A, illustrating a conductive path that includes the upper and lower parts as well as the resistance braze metal.

Turning now to FIGS. 3A-3C a longitudinal sectional view of the piston body 1 is illustrated in regard to another exemplary bonding process. In this exemplary approach, the exemplary piston 1 is shown being joined in an exemplary process where the crown 2 and skirt 3 are bonded together using a resistance brazing process employing a brazing material 8. More specifically, in FIG. 3A the crown 2 is shown spaced apart from the skirt 3, such that the mating surfaces 9$a$, 9$b$ and 10$a$, 10$b$ are each spaced apart, with a brazing material 8 positioned on the outer mating surface 9$b$ of the skirt 3. The brazing material 8 may be formed of any material that is convenient, e.g., a conductive material susceptible to being melted in a resistance brazing process. Merely as examples, nickel, copper, cobalt, or brass materials may be used as the brazing material 8.

In examples where a brazing material is employed, a flux material (not shown) may be provided in addition to the brazing material. Exemplary flux materials may include, merely as examples, a Borax (sodium borate, sodium tetraborate, disodium tetraborate) material. A flux material may help reduce or eliminate oxidation of the brazing material, and may enhance the effectiveness of electrical current at melting the brazing material 8 and bonding workpieces together. Flux material may be positioned between the brazing material 8 and the workpiece, e.g., the crown 2 and/or skirt 3.

The crown mating surface 9$a$ may then be brought into proximity with the corresponding skirt mating surface 9$b$, and in this case may be brought into contact with the brazing material 8, as shown in FIG. 3C. An electrical current may then be provided that runs through the crown 2 to the skirt 3, and in particular along a conductive path 16$b$ that includes both the crown mating surface 9$a$ and the skirt mating surface 9, as well as the brazing material 8 (and, where applicable, any flux that is applied to the brazing material 8). The electrical current may heat the brazing material 8, thereby melting the brazing material 8 along or near the crown and skirt mating surfaces 9$a$, 9$b$. The current may then be cut off, such that the melted brazing material 8 solidifies, thereby permanently bonding the crown 2 and skirt 3 along the crown and skirt mating surfaces 9$a$, 9$b$. Moreover, the process of melting the crown 2 and/or skirt 3 along the outer mating surfaces 9$a$, 9$b$ may waste some of the brazing material 8, and in some cases also some of the material of the crown 2 and/or skirt 3, thereby bringing the crown 2 and skirt 3 closer together. The resultant resolidified brazing material 7, as shown in FIG. 3C, may thus be smaller in height than the brazing material 8 initially (See FIG. 3A), although in many examples the difference in height may be very small. In one example, the wasted brazing material allows the other pair of mating surfaces, in this example the inner mating surfaces 10$a$, 10$b$, to come into contact, thereby generally enclosing the cooling gallery 4. As noted above, a difference in vertical offset differences between the crown mating surfaces 9$a$, 10$a$ (i.e., offset distance $D_U$) and the skirt mating surfaces 9$b$, 10$b$ (i.e., offset distance $D_L$) may be very small, and need not be very large.

Exemplary brazing materials 8 may be provided in a number of ways. Merely as examples, brazing material 8 may be provided in a relatively thin foil that is formed as a separate part from the workpieces, i.e., the crown 2 and skirt 3. The foil may then be positioned on the crown mating surface, e.g., outer mating surface 9$a$, or skirt mating surface, e.g., outer mating surface 9$b$ for the resistance brazing operation. In another example, a brazing material is applied to one of the workpieces in a plating process. More specifically, brazing material may be applied to either the crown mating surface, e.g., outer mating surface 9$a$, or the skirt mating surface, e.g., outer mating surface 9$b$, in an electrochemical plating process or an electroless plating process. In this manner, the brazing material 8 is generally joined to one of the workpieces, i.e., the crown 2 or skirt 3, prior to initiation of the resistance brazing process.

Figure 4:
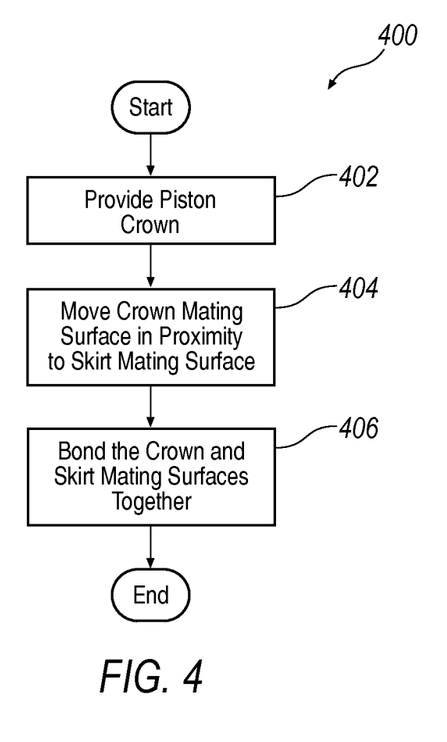
FIG. 4 is a process flow diagram for an exemplary process of making a piston assembly.

Turning now to FIG. 4, an exemplary process of making a piston assembly is described in further detail. Process 400 may begin at block 402, where the crown is provided. For example, a crown 2 may be formed as described above, in a casting, forging, or machining operation, merely as examples, and out of any material that is convenient. Moreover, the skirt 3 may also be formed separately from the crown 2, e.g., in a forging, casting, or machining operation, for example. The crown 2 may define at least in part an upper combustion bowl surface 11, and may also include at least one crown mating surface. In some examples, two mating surfaces 9$a$, 10$a$ may be provided.

Proceeding to block 404, the crown mating surface may be moved in proximity to a skirt mating surface defined by a skirt. For example, as described above a piston skirt 3 may be provided, which cooperates with the crown 2 to define a cooling gallery 4 extending about a periphery of the crown.

The piston skirt 3 may define an outer surface 14 configured to interface with an engine bore surface. In one example, the outer crown mating surface 9*a* is brought into proximity with the outer skirt mating surface 9*b*, while the inner mating surfaces remain further spaced apart. In other exemplary approaches, the inner mating surfaces 10*a*, 10*b* are brought into proximity for bonding, while the outer mating surfaces 9*a*, 9*b* remain further spaced apart. Process 400 may then proceed to block 406.

At block 406, the crown and skirt may be bonded together, e.g., by initiating an electric current along a conductive path between the crown and skirt mating surfaces as described above. A conductive path 16*a*, 16*b* may include at least one conductive material extending from the crown mating surface to the skirt mating surface. The conductive path 16 may thereby provide a generally continuous electrically conductive path for current flowing between the crown 2 and skirt 3. For example, as described above the outer mating surfaces 9*a*, 9*b* remain in direct contact in the example of FIGS. 2A-2C, such that the conductive path 16*a* extends directly along the metallic material defined by the crown 2 and skirt 3. Alternatively, a conductive path 16*b* may include the mating surfaces of the crown 2 and skirt 3 in addition to a brazing material 8. In each of these exemplary approaches, the conductive path 16 is not forced to arc across a gap or space between the crown 2 and skirt 3, but rather is conducted directly from the crown mating surface to the skirt mating surface in the case of the example shown in FIGS. 2A-2C, and directly from the crown mating surface to the brazing material, and then directly to the skirt mating surface in the case of the example shown in FIGS. 3A-3C.

When the crown 2 and skirt 3, and in some examples the brazing material 8, are in mechanical contact, a resistive current may be passed through the skirt 3 and crown 2. The heat generated by this electric circuit may be of sufficient energy and density to raise the weld metal above its melting temperature.

When the weld metal alloy is in the liquid phase, the current may be removed from the crown 2 and skirt 3. With the current removed, the liquid metal freezes and the crown 2 and skirt 3 are thus joined as a single piston assembly 1.

In some exemplary approaches, bonding the crown and skirt together includes positioning a brazing material 8 between the crown and skirt mating surfaces, e.g., outer crown mating surface 9*a* and outer skirt mating surface 9*b*. These examples may be bonded in a resistance brazing process. Alternatively, bonding the crown and skirt together may include contacting the crown and skirt mating surfaces directly together such that the conductive path comprises the crown and skirt mating surfaces. The latter exemplary approaches may include bonding the crown and skirt together in a projection resistance welding process.

In each of the exemplary approaches described above, bonding the crown and skirt together may include maintaining a position of the crown 2 and skirt 3 with respect to the conductive path 16 while heating at least one of the crown, skirt, or brazing material. For example, the piston assembly 1 may be clamped, thereby maintaining a position of the crown 2 and skirt 3 relative to one another as the relevant material is heated to a melt temperature. Accordingly, while cooling the melted material below its melt temperature, the crown 2 and skirt 3 are held together and any positioning error is minimized, if not eliminated. Additionally, the amount of weld metal from the crown 2, skirt 3, and/or brazing material 8, required to bond the skirt 3 and crown 2 into a single, functional piece is a known, fixed value, further reducing opportunities for positioning error in creating the piston assembly 1.

In some examples, a known and fixed amount of material is melted, e.g., the brazing material 8 and/or material of the crown 2 or skirt 3. In one exemplary illustration, a nickel base of welding metal alloy comprising the brazing material 8 is applied to the top, outer circumferential mating surface 9*b* of the skirt 3.

The exemplary piston assemblies 1 and processes described herein may facilitate intricate and difficult to access features to be formed in the internal parts of the piston to be mechanically bonded such as the crown 2 and skirt 3. Some of the internal features, e.g., the cooling gallery portions 4*a* and 4*b*, may provide cooling of the extremely high temperatures the piston is exposed to during engine operation. The exemplary electrical bonding operations such as resistance brazing or projection resistance welding also eliminate or reduce misalignment of the piston components that may occur when current best known welding practices are used to bond the two piston components into a single piece. Additionally, resistance brazing does not require the work piece to be processed in a controlled environment, such as a vacuum oven required for vacuum brazing processes.

Additionally, the exemplary electric bonding methods are static in nature. For example, during both resistance brazing and projection resistance welding, the crown 2 and skirt 3 may be held in a fixed relative position, which allows more accurate positioning that is not possible in dynamic operations such as friction welding, where one part is moving relative to the other.

Additionally, the amount of weld material used is generally a predetermined, known quantity. The amount of vertical or Z-dimension change can thereby be accurately calculated before the exemplary bonding operations, and the necessary dimensional corrections and compensations can be made to the component pieces before the bonding operations. Additionally, excess material, such as "weld spatter" or burrs may be present in the cooling gallery after a typical welding operation, is practically eliminated.

Additionally, the presence of a single bonding surface located between the two joined pieces, e.g., along the outer mating surfaces 9*a*, 9*b*, may be advantageous. The bonding process may thereby include passing a sufficient and known electric current density through the skirt and crown pieces. The resistance of the two pieces allows the electric current to melt brazing material present between the two work pieces, or material of the two work pieces. A single bonding surface between the two pieces may be more controllable compared with examples where a plurality of surfaces between the two pieces are in contact. With a plurality of surfaces present, electric current density, dwell time of the electric current through the work piece, and the differential resistance of multiple bonding surfaces may make it difficult to standardize the parameters of the bonding operation.

Nevertheless, in other exemplary approaches it may be possible to join multiple mating surfaces, e.g., the mating surfaces 9*a*, 9*b* and also the mating surfaces 10*a*, 10*b*. For example, electric current may be substantially directed across a single one of the mating surface pairs at a time, e.g., by positioning electrodes in direct proximity to only one of the mating surfaces at a time.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

What is claimed is:

1. A method, comprising:
   providing a piston crown defining at least in part an upper combustion bowl surface, the piston crown including an inner crown mating surface and an outer crown mating surface;
   moving the crown mating surfaces in proximity to an inner skirt mating surface and an outer skirt mating surface defined by a piston skirt,
   bonding the crown and skirt together in a resistance brazing process wherein the crown and skirt cooperate to define a cooling gallery extending about a periphery of the crown, such that a first conductive path is formed to one side of the cooling gallery and a second conductive path is formed to another side of the cooling gallery by initiating an electric current along the first and second conductive paths between the crown and skirt mating surfaces to either side of the cooling gallery, the bonding steps including:
   1) bonding the crown and skirt together through the first path which is defined by the inner crown mating surface and the inner skirt mating surface to form a first bond to the one side of the cooling gallery, which allows the second conductive path which is defined by the outer crown mating surface and the outer skirt mating surface to form to the another side of the cooling gallery, causing the conductive path to form on both sides of the cooling gallery; or
   2) bonding the crown and skirt together through the second path which is defined by the outer crown mating surface and the outer skirt mating surface to form a second bond to the another side of the cooling gallery, which allows the first conductive path which is defined by the inner crown mating surface and the inner skirt mating surface to form to the one side of the cooling gallery, causing the conductive path to form on both sides of the cooling gallery.

2. The method of claim 1, wherein bonding the crown and skirt together includes positioning a brazing material between the crown and skirt mating surfaces, the brazing material included in the conductive path.

3. The method of claim 1, wherein bonding the crown and skirt together includes contacting the crown and skirt mating surfaces directly together such that the conductive path comprises the crown and skirt mating surfaces.

4. The method of claim 1, further comprising maintaining a position of the crown and skirt with respect to the first and second conductive paths while heating at least one of a crown material, a skirt material, and a brazing material to a melt temperature associated with the at least one of the crown material, the skirt material, and the brazing material.

5. The method of claim 1, wherein the first conductive path includes a first skirt mating surface in contact with a first crown mating surface, and the second conductive path includes a second skirt mating surface in contact with a second crown mating surface.

6. The method of claim 5, further comprising initiating the electric current along the first conductive path and the second conductive path such that the electrical current passes as a differential current to both sides of the cooling gallery.

7. The method of claim 6, wherein a first bond is formed along the first conductive path and a second bond is formed along the second conductive path.

* * * * *